United States Patent [19]

Bissell et al.

[11] Patent Number: 5,067,100
[45] Date of Patent: Nov. 19, 1991

[54] METHOD OF CALIBRATING MECHANICAL PRESSURE GAUGES

[75] Inventors: Robert D. Bissell, Orange; Nicholas E. Ortyl, III, Middletown, both of Conn.

[73] Assignee: Dresser Industries, Inc., Dallas, Tex.

[21] Appl. No.: 570,913

[22] Filed: Aug. 22, 1990

[51] Int. Cl.⁵ .......................... G01L 7/04; G06F 15/46
[52] U.S. Cl. ................................ 364/571.01; 364/558; 73/4 R
[58] Field of Search ............... 364/571.01, 571.02, 364/571.05, 571.06, 571.07, 571.08, 580, 578, 505, 506, 558; 73/741, 740, 742, 743, 1 R

[56] References Cited

U.S. PATENT DOCUMENTS

| | | | |
|---|---|---|---|
| 3,948,103 | 4/1976 | Rosaz | 73/744 |
| 4,019,363 | 4/1977 | Sanford | 73/1 R |
| 4,055,085 | 10/1977 | Wetterhorn | 73/418 |
| 4,109,537 | 8/1978 | Gorgens et al. | 73/756 |
| 4,148,123 | 4/1979 | Neubeck et al. | 29/407 |
| 4,168,631 | 9/1979 | Wetterhorn et al. | 73/741 |
| 4,237,738 | 12/1980 | Wetterhorn | 73/740 |
| 4,240,298 | 12/1980 | Wetterhorn | 73/732 |
| 4,246,796 | 1/1981 | Wetterhorn | 73/732 |
| 4,337,664 | 7/1982 | Kipp et al. | 73/741 |
| 4,361,046 | 3/1982 | Wetterhorn et al. | 73/711 |
| 4,378,160 | 3/1983 | Vlad et al. | 364/571.05 |
| 4,444,057 | 4/1984 | Wetterhorn | 73/739 |
| 4,481,596 | 11/1984 | Townzen | 364/571.05 |
| 4,485,676 | 12/1984 | Wilson | 73/741 |
| 4,502,334 | 3/1985 | Gorgens et al. | 73/705 |
| 4,542,654 | 9/1985 | Wilson et al. | 73/741 |

FOREIGN PATENT DOCUMENTS 0073436 4/1985 Japan .............................. 364/571.01

*Primary Examiner*—Parshotam S. Lall
*Assistant Examiner*—Michael Zanelli
*Attorney, Agent, or Firm*—Hubbard, Thurman, Tucker & Harris

[57] ABSTRACT

A method of calibrating mechanical pressure gauges utilizes the dial indicator pointer to amplify and measure the small angular displacement of a pivoting movement element drivingly engaging a pinion gear to turn the pointer shaft and determines with the aid of an analogue model, usually in one iteration, the gain setting necessary to span the gauge and the position of the pivoting movement to establish acceptable linearity without bending the mechanical linkage or changing the movement connecting link. The method includes a method of establishing the model and utilizes a programmed computer to accept the few measurements required, perform the method computations and instruct the operator. The method is applicable to gauges having a pressure measuring element which moves in response to pressure and a linkage connected to a movement, such as Bourdon tube gauges.

22 Claims, 6 Drawing Sheets

METHOD OF CALIBRATING MECHANICAL PRESSURE GAUGES

BACKGROUND OF THE INVENTION

1. Field of the Invention

The invention relates to a method for effecting the calibration of a mechanical pressure gauge to achieve a required degree of linearity between movement of the pointer of the gauge and the applied pressure.

2. Summary of the Prior Art

Mechanical pressure gauges consist of a pressure measuring element and a mechanism (commonly called a "movement") which converts the general linear motion of the pressure movable element into rotary motion of a pinion upon which is mounted a dial indicating pointer which indicates pressure on a circular dial. Because of the geometric relationship between the linear moving pressure element and the rotational movement of the pinion, the rotation of the pointer is never linear with respect to the motion of the pressure movable element. Typical gauges of this type are shown in U.S. Pat. Nos. 4,055,085, 4,148,123, 4,240,298, 4,361,046, and 4,542,654. For each of the typical pressure gauges shown in the aforementioned patents, the best degree of non-linearity of pointer rotation which can be achieved approximates a sine wave as shown in the graph of FIG. 1. As shown there, the error varies from zero at the zero pressure and maximum pressure ends of the pointer dial and progresses in a sine wave between these two points with another zero being recorded at the midway point or the 135° position. The permissable non-linearity of highly accurate industrial pressure gauges is preferably less than one quarter of one percent. If this degree of non-linearity, or less, is obtained, then the gauge will readily meet the accuracy requirements of the industry which are generally on the order of not more than one half of one percent. Unacceptable calibration curves are also shown in FIG. 1, even though the calibration error is zero at full scale, illustrating the necessity for checking the accuracy of the calibration at one or more pressures intermediate zero and full scale.

To obtain the ideal baseline curve, a variety of adjustments have heretofore employed, such as rotating the movement mechanism, bending the tip of the Bourdon type pressure element, or adjusting the length or span of a connecting link between the pressure element and the segment. Any one of these adjustments, even though limited to very small magnitudes, may drastically effect the non-linearity of the pressure scale at mid scale by as much as one half of one percent. Any one adjustment generally requires another variable to be adjusted.

Each of the aforementioned patents mention the calibration problem. As stated in U.S. Pat. No. 4,148,123:

"It is obvious that every adjustment of the span necessarily changes linearity and that every adjustment in linearity in turn influences the span so that as a rule the span and linearity have to be adjusted several times in an alternating fashion until the desired display tolerances are attained. It is self evident that the conventional adjustment procedure is thus a time consuming and expensive operation."

Prior to the present invention, calibration for linearity was accomplished only by skilled operators who could, by experience, judge the type and amount of adjustments needed, make the adjustments, and then check the position of the pointer at zero, quarter scale, mid scale, three quarter scale and full scale to determine whether the proper adjustment had been made. Many iterations of this procedure were required in order to achieve the desired accuracy. Obviously, if the amount of movement rotation, tip bending or span adjustment were known in order to change any midpoint non-linearity to the desired zero level, the known amount of adjustment could be made without the need to readjust and recheck the linearity many times.

SUMMARY OF THE INVENTION

The invention provides a method of quickly and inexpensively setting the span and linearity of a highly accurate pressure gauge without a high degree of operator skill. Although the method is generally applicable to pressure gauges with any desired degree of non-linearity, it is most useful when applied to gauges having ½ or ¼ percent or less non-linearity capability. A computer program is used to make the necessary calculations and lead an unskilled operator through a sequence of steps which results in calibration of a gauge to one quarter percent of full scale or better. Even very skilled operators have difficulty reaching that level of non-linearity because the skill required and number of iterations of adjustment increases many fold as the desired non-linearity goal is reduced.

In accordance with this invention, a model is developed to reflect the amount of non-linearity in the linkage of an example gauge at all positions of the segment gear with respect to the pinion gear at selected percentages of full scale range. The amount of adjustment of each adjustment variable required to effect a predetermined change in non-linearity is calculated by a computer program for each particular type and geometry of gauge. The invention discloses development of a model and use of the model in a procedure permitting precise controlled adjustments to achieve the desired linearity without altering the mechanism in any way. The procedures recognizes that the gauge pointer itself amplifies and can be used to precisely measure very small angular displacements of the movement or segment. No tip bending or link length adjustment is required.

For the purposes of the disclosure of this invention, the gauge that will be utilized as an example for calibration is that sold by the Instrument Division of DRESSER INDUSTRIES at Stratford, Conn. under the names of ASHCROFT DURAGAUGE ® or TEST GAUGE ® pressure gauges. DURAGAUGES ® have one half percent while TEST GAUGES ® have one quarter percent guaranteed percent non-linearity full scale. To aid in understanding the method of this invention, a schematic view of the pertinent working elements of a gauge is shown in FIGS. 2A, 2B, 2C and 3 of the drawings, and will be briefly described.

As shown in FIG. 3, the pointer tip of the gauge cooperates with a rotary dial bearing indicia from zero to maximum pressure over a span of 270degrees. The pointer is mounted on a pointer shaft (FIG. 2B) which is angularly shifted by a pinion which is driven by a gear segment. The gear segment has a radial portion defining a hole for receiving a segment shaft (FIG. 2C) which constitutes a "pivot pin" for the segment gear around which the segment pivots. The segment shaft is supported between a lower mounting plate and an L-shaped top plate which are spaced and secured together by two tubular spacers suitably fastened in place between the plates.

The Bourdon tube (FIG. 2A) is supplied with pressured fluid through the fluid pressure inlet. The tip of the Bourdon tube is connected to the segment by a connecting link to a movement mechanism. The entire movement mechanism may be angularly adjusted relative to the center of the dial indicator or pointer of the gauge by loosening and then tightening the mounting screws which cooperate with arcuate slots in the lower mounting plate of the movement mechanism.

The movement of the end of the Bourdon tube in response to applied pressure is transmitted by a linkage to the pivotally mounted end of the segment at an adjustable distance from the pivot to produce a "gain" in the pivoting movement of the segment and pointer. The axis of the pivotal mounting is designated at point A on the movement. The linkage normally comprises a bimetallic temperature compensator and a connecting link. The temperature compensator is not involved in the calibration method of this invention hence the connecting link may be considered as being a fixed length, rigid link.

As best shown in FIGS. 2A and 2B, the connecting link is roughly of U-shaped configuration and may include having its free ends interconnected by a fine thread, micrometer adjustment screw. The connecting link is attached to a serpentine metal band which is called a "slide". A mounting bar projects from the medial portion of the slide and is adjustably secured to the radial portion of the segment gear by two screws which traverse a span adjustment slot in the segment gear radial portion. This provides a coarse adjustment for the span adjustment distance. At another location on a bight portion of the slide a pivot tab defines a hole having an axis B which receives a screw for pivotal connection to the connecting link.

The distance between points A and B is commonly referred to as the span adjustment distance (FIG. 2A). When a line is drawn between point A and the pointer shaft axis C, and another line is drawn from point A radially along the centerline to the periphery of the segment gear, the angle between such lines is known as the segment angle, as shown in FIG. 2A.

Similarly, a line drawn between pivot points B and D and the aforementioned radial line along the centerline of the segment when no pressure is applied to the gauge, defines a starting angle.

Such gauge is originally assembled with all of the components disposed in their normal positions called for by the design drawings, hereinafter sometimes referred to as an "example gauge" which in this case is a 100 pound per square inch (psi) gauge. This normal component position does not, however, take into account the effect of variances in dimensions and spacing of the parts produced by the necessary manufacturing tolerances and linkage assembly. Hence, it is almost axiomatic that ever gauge, once assembled, requires calibration. The linkage produces some non-linearity between actual pressure applied and the gauge pressure reading.

It is possible to calculate for every given departure in linearity of the gauge at its 50% pressure position, the amount of movement adjustment required to effect the change in the mid point reading to the proper level, within the accepted tolerance limits. Such calculation is made by a computer program developed for such purpose. The computer program calculates the amount of change in segment angle or linearity required in the event that the application of pressure to the gauge results in an erroneous positioning of the gauge pointer.

A baseline gauge which is known to be in calibration is laid-out on a computer screen in a CAD (computer aided design) program at nominal design tolerance and the angular relationship of the segment and spacing of the span adjustment distance at zero pressure determined. This is used as an analogue model of the gauge linkage which may be maniplated to produce all possible segment angles for gauges having the same geometrical relationship in the linkage. The linkage is manipulated to selected 25%, 50%, 75% and 100% full scale positions and the angular deviations from theoretical are determined. Then similar deviations are created by manipulating the movement to extreme and intermediate positions of the segment gear from the baseline position at each of the theoretical percentages of full scale from 0 to 100 percent. The difference in the deviations of the segment of the extreme and intermediate cases from the baseline case represent the non-linearity which is converted into angular movement of the pointer and corrected to represent percent of non-linearity full scale. A linear relationship is developed between pointer rotation angle and percent non-linearity at the half scale point over what the baseline gauge would give. This permits using the pointer angle of an uncalibrated gauge at full and half pressure to be used to determine the segment angle adjustment necessary to produce near baseline conditions by adjustment of only the span adjustment distance and rotation of the movement.

Obviously, different calculation programs are required for gauges utilizing different movement geometry, tip travel and position of the Bourdon tube.

In addition to these computer calculation programs, instructions can be incorporated in the computer for display to the person doing the gauge calibration to take him/her through a step by step procedure to effect the calibration of the gauge to achieve linearity within the prescribed limits of accuracy.

The steps involved in such calibration are as follows:
Remove pointer from Gauge.
Apply enlarged calibration protractor and pointer (FIG. 4).
Select computer program for size and type of Gauge.
Set pointer at 0°.
Measure span adjustment distance and input to computer.
Apply maximum pressure to Gauge.
Read pointer (in degrees) and input to computer.
Calculate by computer, the span adjustment distance.
Reduce pressure to zero.
Make first span adjustment by moving mounting bar along slot in segment.
Confirm that the span is 270 degrees at full pressure.
Apply 50% pressure to Gauge.
Read pointer and input to computer.
Calculate by computer, segment angle adjustment required.
Reduce pressure to zero.
Make segment angle adjustment.
If pointer is not at zero degrees set the pointer at zero degrees.
Apply 50% pressure.
If Gauge reads within tolerance, apply 100% pressure. If Gauge reads within tolerance, calibration is normally completed.

Check calibration at 25% and 75% pressure.
Reduce pressure to zero.
Remove calibration protractor and pointer.
Replace Gauge pointer.

In the event that the completion of the aforementioned steps do not bring the gauge calibration within the prescribed accuracy limits, the calibration procedure can be repeated again, with the computer program again doing the essential calculations for determining the amount of the adjustments to be made. It has been found that at least 90 percent of the time the employment of the above outlined steps will result in proper calibration of the gauge in one iteration of the procedure. In the few cases where calibration is not achieved in one iteration only an additional iteration or two of the process is required.

As stated, instructions for the calibrating operator are also stored in the computer memory and are displayed sequentially as the calibration procedure proceeds. Pursuant to the displayed instructions, the operator takes several measurements and readings (in terms of linear inches and angular degrees), inputs them into the computer and the program back calculates the current position of the segment gear and Bourdon tube tip travel, and then forward calculates an output of the movement adjustments to be made. Any minor measurement errors made during the input stage are converged upon during the adjustment process.

The utilization of the aforedescribed computer program and enlarged protractor dial significantly reduces the amount of time and operator experience needed to calibrate a mechanical pressure gauge. A kit for practicing the process may be obtained which includes an enlarged protractor and pointer, a dial centering fixture which slips over the pointer shaft, a special micrometer to measure the span adjustment distance and a wrench to adjust the fine slide micrometer screw.

Further advantages of the invention will become readily apparent to those skilled in the art from the following detailed description of a preferred method of calibration of a conventional gauge, taken in conjunction with the annexed sheets of drawings.

DETAILED DESCRIPTION OF THE INVENTION

Method For Development Of The Model

Figure 1:
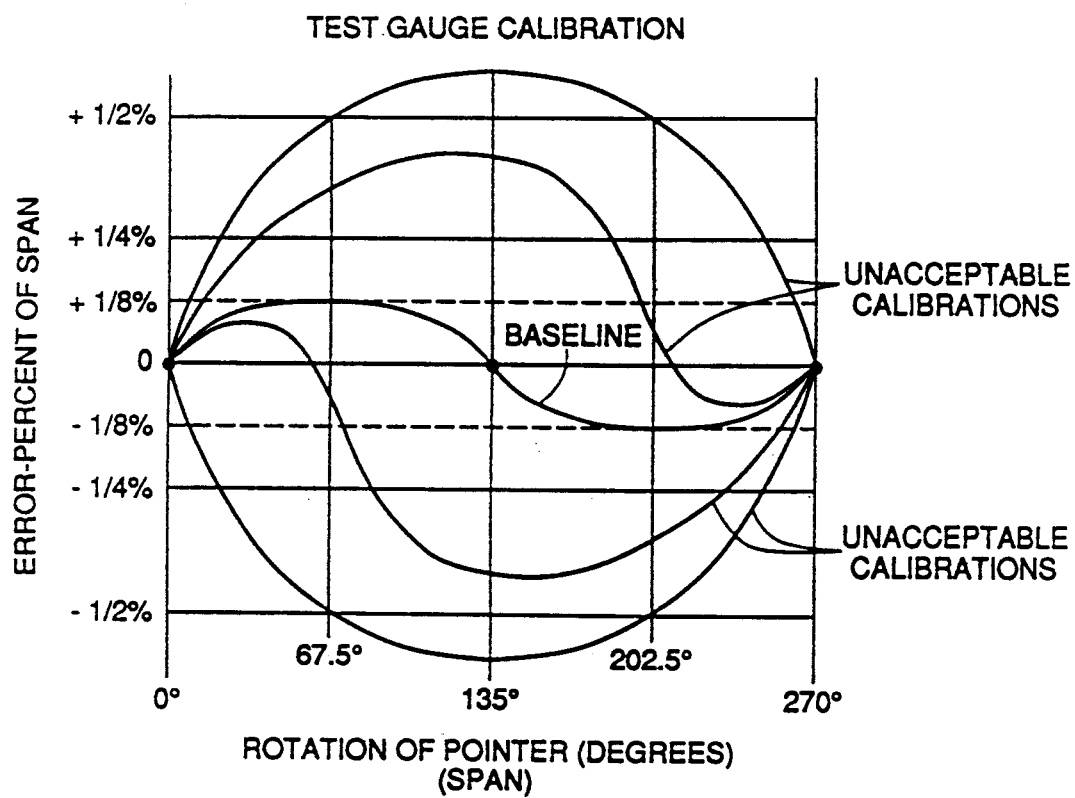
FIG. 1 is a view illustrating the normal linearity curves for a conventional Bourdon type gauge.

An analogue model was developed to calibrate a Bourdon tube pressure gauge although the method would be applicable to similar gauges connected through a mechanical linkage to a pressure reading pointer which is operated by a pressure measuring element that deflects when pressure is applied and a geared movement that translates the deflection into pivotal or rotary motion. The steps are as indicated below:

STEP 1—Layout Mechanical Linkage In Operative Relationship

This is preferably done with the help of a computer using a computer aided design (CAD) program to simulate the functioning of the linkage mechanism. It would be considerably more difficult to perform this step by hand although it may be possible to do so. The parts are laid-out as if they were at nominal tolerance although it is recognized that each of the parts will have variable dimensions according to the tolerance of manufacturing which when assembled have starting orientations which will influence the result. Of particular importance is the segment angle which is the angle between the centerline of the segment gear arm and a line drawn from the segment pivot shaft A on FIG. 2A through the dial pointer shaft C which necessarily bisects the pinion gear which drives the pointer. This angle may arbitrarily be thought of as positive or negative as the segment centerline swings across the zero segment angle position. The movable part of the segment contains a radial array of gear teeth at one end which drivingly engages the pinion gear to rotate the pointer shaft and pointer on the gauge by contact with the pinion gear.

The other important variable is the span adjustment which is the distance between pivot point A of the segment arm and the center of the pivot connection B for the link which is connected to the tip of the Bourdon tube at its other end D. The link length is the distance B to D. The Bourdon tube is curled and tends to straighten when pressurized. The tip of the Bourdon tube moves linearly proportionate to applied pressure a short distance which for the example gauge constitutes a nominal tip travel of 0.16 inches between 0 and 100 pounds per square inch gauge pressure.

Nominal dimensions are given in Table I which is the baseline calibration. The baseline model is taken as a gauge which is adjusted to produce minimum non-linearity over the full scale range. This is preferably obtained from production line data. The link length taken is a standard 0.75 inches and the span adjustment distance B to A is taken as a standard 0.396 inches as indicated in Table I. The start angle is the angle between the centerline of the link member running through B and D on FIG. 2A and the centerline of the segment running through the pivot A of the segment. At an arbitrary starting position the start angle is 77.8° and the segment angle is 8.22° representing a zero pressure condition for the baseline gauge case.

It is important to recognize that the span adjustment distance B to A constitutes a "gain" because it causes segment gear rotation through the linkage which increases segment gear travel for a given movement of the link as the span adjustment distance is decreased and decreases the corresponding travel of the segment gear as the span adjustment is increased.

STEP 2—Adjust The Model To The Best Baseline Calibration

With the design dimensions, preferably the nominal dimensions, of the linking and pivoting elements in the CAD system, the model is adjusted on the basis of an assumed designed tip travel of 0.16 inches between zero pressure and full gauge pressure which in the example gauge reflected in all the tables is 100 pounds per square inch gauge pressure (psi). This type of gauge has what is known as a four-bar linkage which is adjustable. The gauge dial is "replaced" by an enlarged protractor centered over the pointer shaft so that an enlarged pointer measures angles instead of pressure. Gauges of this type are typically built for a pointer travel at full scale of 270° although the method would work equally well for gauges having a different span angle, with appropriate adjustments. Column 1 of the tables shows the theoretical percent of full scale which in the case of the example gauge is the actual range of the gauge itself. The percent of full scale is used because that is generally applicable to gauges with a range which is different than 100 pounds per square inch.

Since the pinion is secured to the pointer shaft and the range is 0° to 270 degrees it is easily seen that Column 5 represents the theoretical pinion angle at various theoretical percentages of full scale indicated in Column 1 of the tables. For example, the 50 percent point corresponds to half of 270° which is 135° and the quarter scale pinion angle is 67.5° which is half of 135°. At 0 percent full scale in the baseline case the theoretical and calculated pinion angle are taken as 0 degrees and the segment angle is taken as 0 degrees.

STEP 3—Determine Deviation Of Pinion Angle And Segment Angle From Baseline Calibration The theoretical segment angle in Column 2 is obtained by dividing the theoretical pinion angle in Column 5 by the fixed gear ratio between the pinion gear and segment gear of 11.6 given in Column 4 of the tables. This ratio is a function of the radius arm of the segment which acts like a large gear operating on the smaller pinion gear driving the pointer arm. There is some non-linearity caused by the four-bar linkage which results in small deviations of the segment angle and corresponding pinion angle at the selected quarter, half, three quarter and full scale positions. The fractional degrees of the deviation in the pinion angle are given in Column 7 as positive and negative deviations.

STEP 4—Convert Degrees Of Pinion Deviation To Percent Non-Linearity At Full Scale Since the actual degrees of deviation of the pinion angle are related to a full scale angle of 270° it is proportionately less with respect to a full scale of 100. The deviation is converted to a percent non-linearity at full scale which is given in Column 8 of Table I.

STEP 5—Determine The Dial Non-Linearity Correction If Applicable

The dial percent non-linearity full scale is given in Column 9 of all of the tables which is seen to be the same for all example cases.

The example gauge has a goal of better than ⅛% non-linearity full scale. This figure could be a greater or lesser percentage for different gauges or for gauges made by someone else. It has been determined experimentally and with the aid of statistics applied to manufacturing data that a properly made and optimally calibrated gauge of the example type has an inherent non-linearity as shown by the baseline "ideal" curve in FIG. 1. The "four-bar" linkage under the best conditions produces a sine wave graph of non-linearity as a percent of span as the linkage is rotated by pressurizing the gauge from zero percent of gauge span to 100% of gauge span. Characteristically the error is positive initially than passes through zero linearity error at 50% of span and becomes negative until it returns to zero non-linearity at 100% of span. A Bourdon tube gauge with this kind of linkage at the best condition shows the characteristic pattern of the ideal baseline curve of FIG. 1. Gauges with less than ideal calibration characteristically follow the pattern of FIG. 1 which are above or below the ideal baseline curve depending upon the amount of non-linearity due to unacceptable calibration.

Since the amount of non-linearity for gauges of the example type at optimum calibration follow the characteristic ideal curve of plus ⅛% of full scale from 0 to 50% span and −⅛% of full scale from 50% of span to 100% of span it is possible to compensate for this known error in making the pressure indicating markings on the face of the gauge. Where the "ideal" known error is positive the gauge pointer tends to read slightly more than actual so the gauge readings are printed slightly farther from the zero point and conversely where the non-linearity is negative the pressure indicating markings are printed closer together so that the deviations of non-linearity along the ideal curve are compensated for on the gauge face or dial by slightly expanding or slightly compressing the scale to zero out the "ideal" non-linearity. The differences are slight so that the observer cannot visually see that the pressure indicating markings are not exactly linear on the face of the gauge. These corrections are exhibited in Column 9 of the tables and since they are compensated for by the dial itself they can be subtracted from the percent non-linearity full scale of the linkage to arrive at the actual gauge percent non-linearity full scale which is given in Column 10. The plus and minus deviations in Column 9 are rounded off to 0.120 to approximately represent ⅛ percent.

STEP 6—Determine The Baseline Case Calibration Over The Full Span Range

The nominal baseline case calibration model which has been laid-out on the CAD screen is now manipulated through its span to determine the amount of deviation in the geometry of the linkage from the theoretical position. The baseline case has an actual segment angle of 8.22° as indicated in Table I but this is taken as zero for the purpose of developing the measurements and calculations in Columns 1 through 10 of Table I. Thus the actual segment angle in Column 3 at 0 pressure is taken as 0 even though the actual segment angle at 0 pressure of the baseline case was 8.22°. This is done merely to simplify and clarify the measurements and does not affect the result.

The baseline linkage is manipulated to a theoretical percent of full scale of 25% and the corresponding segment angle and pinion angle are determined. They are found to have a small deviation representative of the non-linearity caused by the linkage. At theoretical 25% of full scale the pinion angle in Table I is found to be 67.998° instead of the theoretical 67.5° which would have been the reading had there been no linearity problem. The difference between these figures in Columns 5 and 6 is given in Column 7 as a difference of 0.488 angular degrees of deviation in the pinion. The 0.488 degrees of pinion deviation is proportional to a full scale span of 270°. Since the full scale is actually 100 this is proportionately corrected in Column 8 to a figure of 0.181 percent non-linearity of the full scale (%

N.L.F.S.) for the example gauge. This figure represents the percent non-linearity full scale of the linkage at the 25% theoretical point. To this is added the compensated for percent non-linearity in the gauge dial in Column 9 to arrive at the actual percent non-linearity full scale of 0.061 in Column 10. This process is repeated by manipulating the CAD program to produce theoretical percent full scale settings of 50%, 75% and 100% and the corresponding deviations are determined. It is noted that a negative deviation occurs at the theoretical 75% full scale position in the baseline case.

STEP 7—Determine The Non-Linearity Deviations At Minimum Starting Teeth Engagement Over The Full Span In Table II the linkage elements are manipulated with the CAD program to position the segment gear at an extreme position with respect to the pinion gear with the pinion gear just barely engaging the first several teeth at one end of the segment gear. This position is arbitrarily referred to as "minimum starting teeth engagement" and is representative of zero actual gauge pressure. Table III represents the opposite extreme position where the segment is swung to the opposite end, opposite the minimum starting teeth position, with the last few teeth of the segment gear still engaging the pinion gear at full applied pressure. This is referred to as the "maximum starting teeth engagement" position in Table III. The maximum starting teeth position is also accomplished by CAD manipulation of the mechanical linkage elements which includes changing the span adjustment as seen in Tables II and III. It is seen that the minimum starting teeth position produces the greatest absolute segment angle of 29.07 degrees and the maximum starting teeth position represents the minimum segment angle of −0.0895 degrees, both of which represent a zero gauge pressure situation. The baseline position indicated in Table I can be seen to lie roughly halfway between these extreme positions. The segment angle is arbitrarily assigned a negative value after it goes through the zero position which results in a small negative segment angle at the maximum starting teeth position of Table III.

The data in Columns 1 through 10 of Tables II and III are obtained in the same manner as the data for the baseline calibration in Table I. The minimum starting teeth position is taken as representing zero percent full scale and then the segment is moved to a theoretical 25% full scale position where the segment angle being considered (having started at zero) now reads 6.086 degrees as against the theoretical segment angle of 5.189 degrees. The deviation of the pinion angle from theoretical in Column 7 is 3.098 degrees which converts to a percent non-linearity full scale of 1.147 and after the dial correction of 0.120 results in a gauge percent non-linearity full scale of 1.027. This process is repeated through the 50%, 75% and 100% theoretical full scale positions and the corresponding segment angles and pinion angles are determined. The same process is used to obtain the data in Table III with the segment starting from the opposite maximum position. It is seen that the amount of non-linearity in Tables II and III are significantly greater than the non-linearity which was found in the baseline calibration of Table I because of the different starting position of the segment gear with respect to the pinion gear and the corresponding changes in the rest of the linkage. The resulting Column 8 data is plotted in FIG. 5. This represents the baseline condition and the non-linearity that is due to the linkage as the segment gear is manipulated to different positions with respect to the pinion.

STEP 8—Determine The Non-Linearity Deviation For Intermediate Positions Of The Segment Gear Over The Full Span In Tables IV, V and VI the same procedure is followed except that the segment in Table IV is located halfway between the baseline position and the minimum starting teeth position. In Table V the segment is manipulated to a quarter way position between the ideal or baseline position and the minimum teeth starting position and in Table VI the segment gear is positioned halfway between the ideal baseline position and the maximum starting teeth position. In each case the segment angle is again taken as zero at a theoretical zero percent full scale. The linkage is manipulated to produce the 25%, 50%, 75% and 100% theoretical full scale positions to generate the data shown in the tables in the same manner as the data was generated in Tables II and III. The 50% location is good to select as a reference pressure point because the sine wave of non-linearity of the ideal gauge goes through zero at that place. The other intermediate positions are selected arbitrarily as good representative selections to use. The reference pressure of 50 percent of full scale is selected because it is usually most selective of linkage non-linearity, though it is conceivable that the most selective position could be somewhat different for a particular gauge linkage, for example 45 percent or 55 percent, in which case that would be the best reference pressure to use with the method.

Figure 5:
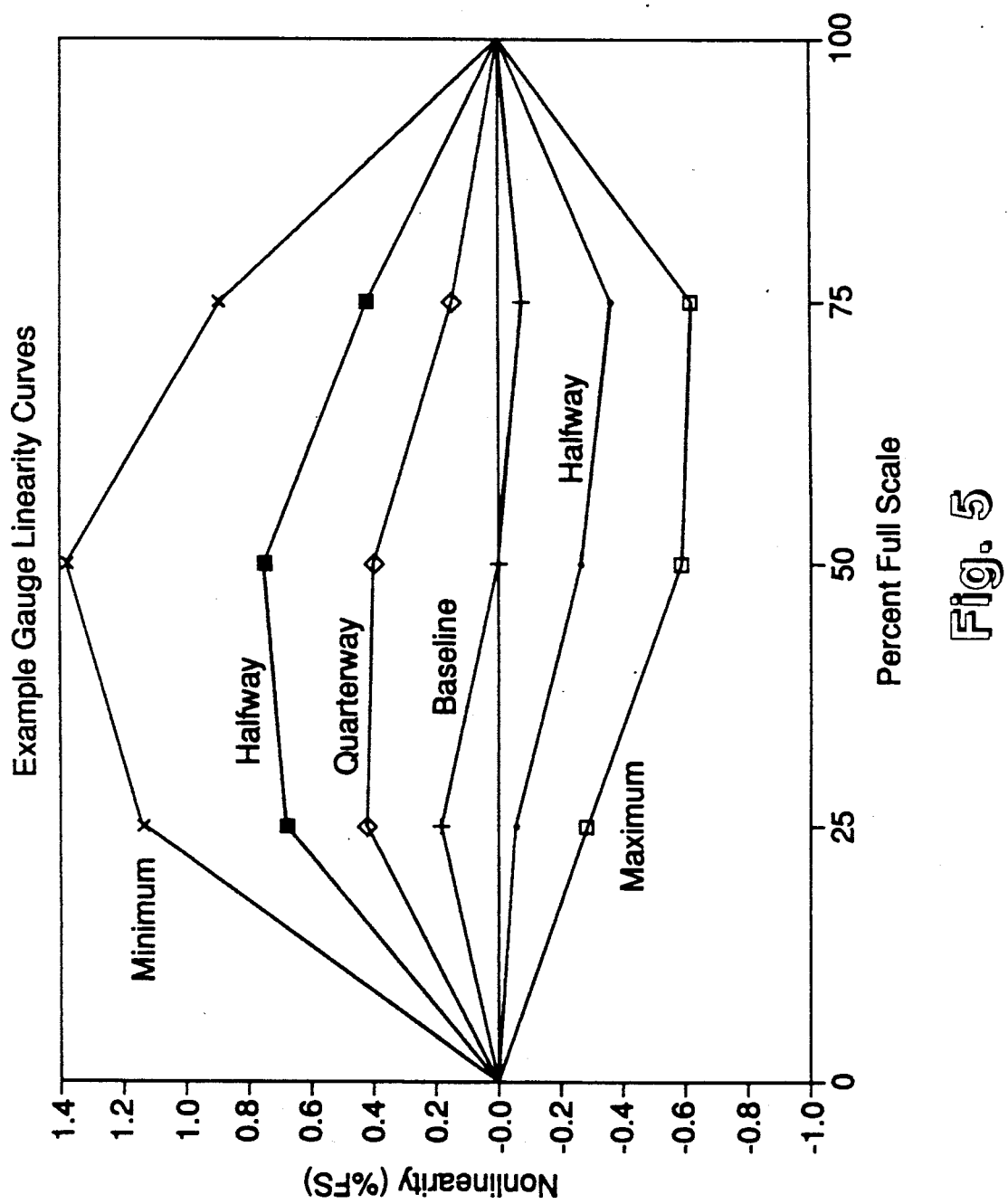
FIG. 5 is a series of linearity curves developed from an Example Gauge.

This data is then plotted on FIG. 5 and identified as the quarter or half positions between the baseline and the minimum or maximum starting positions which were previously mentioned. FIG. 5 shows that the percent of non-linearity full scale depends upon where the segment gear is located with respect to the pinion gear at the beginning of the sequence of movements toward the full scale position.

STEP 9—Determine The Difference Between The Baseline Segment Angle And The Segment Angle Of Each Of The Other Positions Of The Segment And Convert To Degrees Of Pointer Rotation A summary of the data from Tables I through VI is given in Table VII. More particularly, the segment angle for each of the positions of the segment is given in Column 2 of Table VII. For example a segment angle of 29.07 degrees represents the minimum starting teeth position of Table II and a segment angle of 18.167 degrees is given for the halfway baseline to minimum teeth starting position of Table IV.

In Column 3 of Table VII the segment angle from Column 2 for each of the positions is subtracted from the baseline zero pressure segment angle of 8.22°. This for example results in a difference or "delta" segment angle of −20.85 degrees in Column 3 for the minimum start position. The delta segment angle for each case is multiplied by the gear ratio of 11.6 on the pinion to produce the pointer rotation in Column 4 of Table VII. This establishes how much pointer rotation there is between the baseline starting position and each of the other starting positions. The calculated pointer rotation in degrees which is given in Column 4 will be plotted along one axis of FIG. 6.

Column 5 of Table VII is a summary of the deviation of the pinion in degrees at the selected reference position of 50% of theoretical full scale with the baseline position taken as zero. Column 6 of Table VII has the 50% non-linearity of full scale values of Column 5 converted from degrees to percent full scale, which in the example is 100. Again the baseline position is taken as zero. The data of Column 6 are plotted on the other axis of the graph shown in FIG. 6 as 50% non-linearity in degrees (50% NL Degrees).

Figure 6:
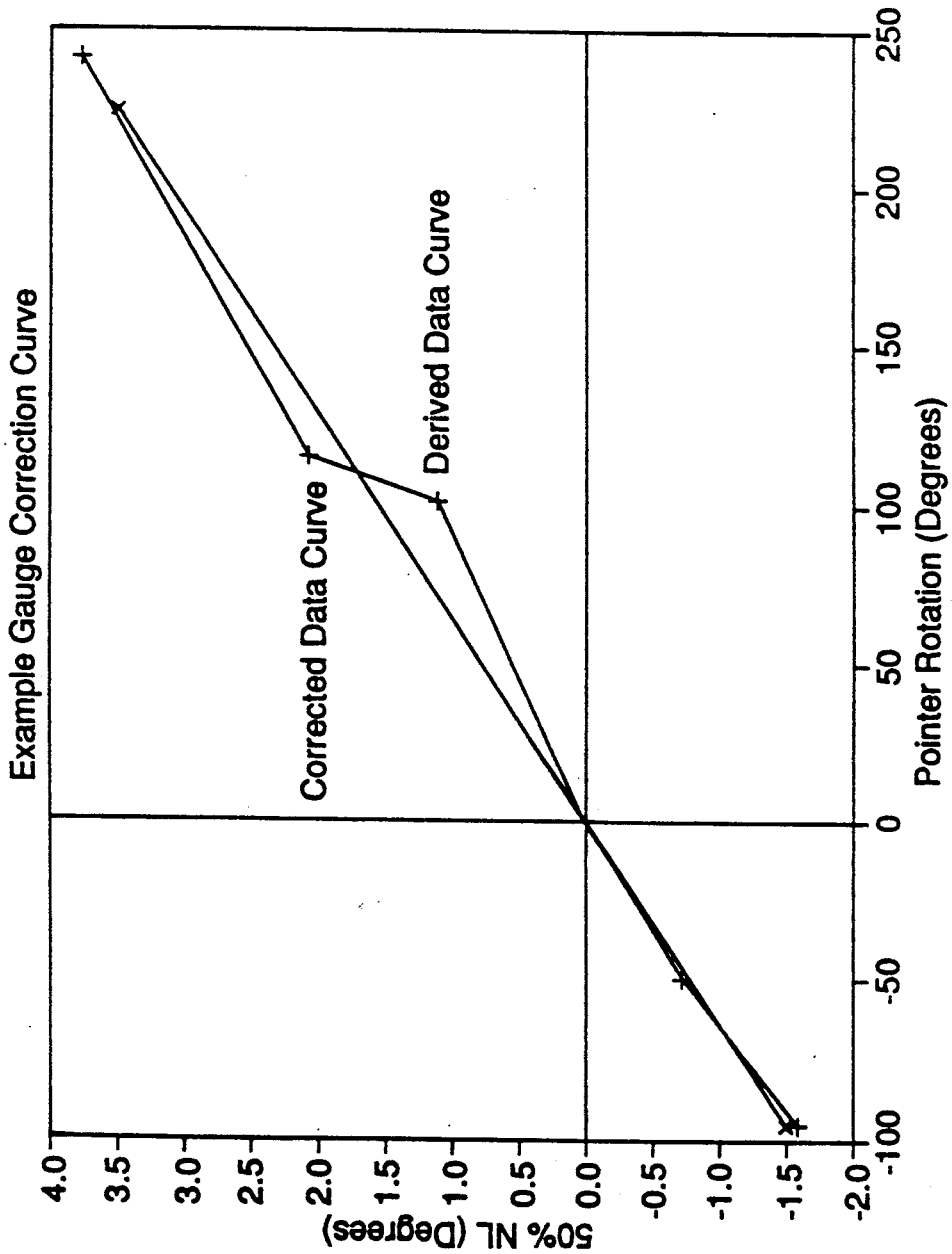
FIG. 6 is a correction curve developed from FIG. 5.

The 50 percent of full scale determinations are selected as a reference position to use in FIG. 6 because as indicated on FIG. 5, it is the position which exhibits the greatest sensitivity or selectivity between the baseline condition and the other conditions shown there and because the baseline case itself contributes no non-linearity as it passes through zero at that 50 percent point. This constitutes a reference position which is usually most representative of the non-linearity deviation over the span. The 50% readings of non-linearity are nearly unique in being able to identify which condition of FIG. 5 most nearly approximates the condition of the uncalibrated gauge in question which is to be calibrated. Experience has shown that occasionally some of the curves of FIG. 5 have the same non-linearity as a percent of full scale at the 25 or 75 percent of full scale positions but it is extremely rare for this to happen, if at all, at the 50 percent points.

The resulting data in FIG. 6 is a nearly straight line of "derived data". The straight line running through the data in FIG. 6 is the least squares best fit line for the data. The straight line which fits the data points then represents at any pointer rotation position the amount of non-linearity at the 50% of theoretical full scale point on any gauge of the same geometry. It should be noted that the zero degree position on the graph of FIG. 6 actually corresponds to 135° with respect to the span of the gauge since data from the 50% theoretical full scale manipulation is used in the graph and 50% of the 270° range is equal to 135°. However the important information obtained from the development of this graph is the relationship between the pointer position in degrees and the degrees of non-linearity deviation at that position. Although not expected, it is conceivable in non-linearity at some position other than at 50 percent in which case that other position should be selected as the reference position.

It should be recognized that the determination of the data in Tables I–VII is based on a tip travel of 0.16 inches over the span and pertains to a particular Bourdon tube position and material. Consequently, in a line of gauges of different capacities, a curve like this will have to be generated for each type of gauge which has a different tip travel and for each gauge which has a different position of the Bourdon tube. A family of the curves of FIG. 6 is necessary to cover a range of different gauges, and this information is best dealt with by means of a computer. The data of FIG. 6 may also be represented by a "look up" table which gives one of the values when the other value is known. The operator initially inputs data that reflects gauge geometry so that the computer can choose the right curve for that kind of gauge. Because essentially a straight line is generated, the data can be determined for any point on the line by means of the equation of the line and the determined data from one axis.

Method For Use Of The Model To Calibrate A Gauge

Figure 3:
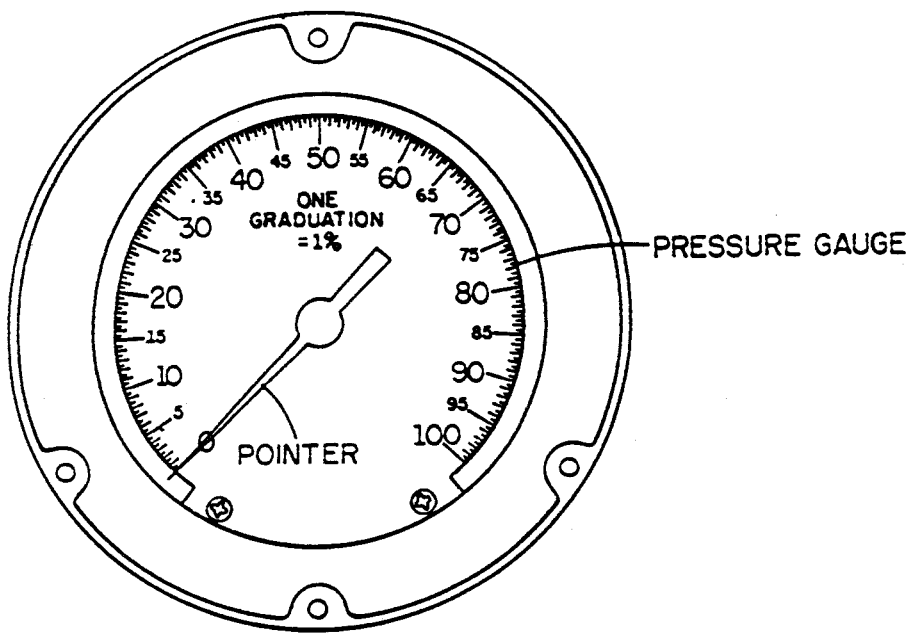
FIG. 3 is a front elevational view of the scale and pointer for the gauge of FIGS. 2A, 2B and 2C.
Figure 4:
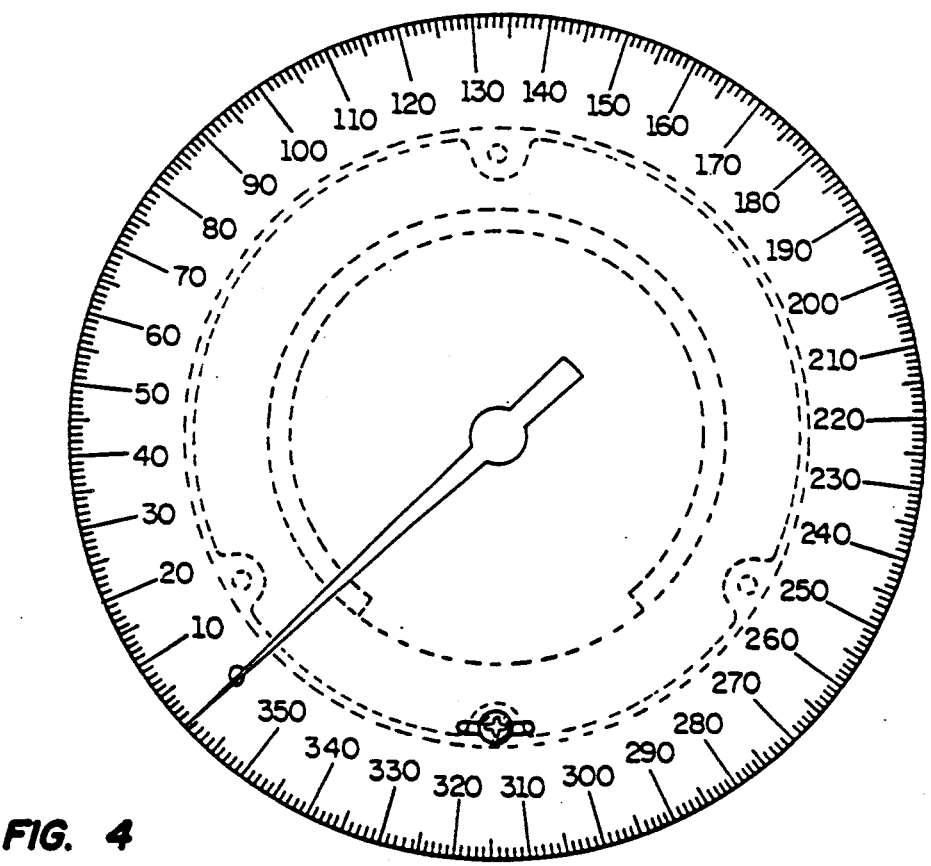
FIG. 4 is a front elevational view illustrating a substantially enlarged protractor scale and cooperating pointer used in the calibration.

Use of the accumulated data culminating in FIG. 6 is accomplished by means of a computer program which utilizes a relationship reflected in FIG. 6 together with actual measurements taken from a real gauge of the same geometry as the example gauge. The uncalibrated gauge in question is adjusted based upon measurements taken of the uncalibrated gauge span adjustment distance and pointer rotation at pressures of 100% full scale and 50% full scale using the relationship developed from the model. The face of the gauge is illustrated in FIG. 3 which includes a boss located radially at the bottom of the gauge for installing a protractor shown in FIG. 4. The protective glass cover over the face of the gauge is removed to permit removal of the gauge pointer. The protractor shown in FIG. 4 is centered over the uncalibrated gauge pointer shaft by means of the screw and slot shown in FIG. 4. The slot permits slight rotation of the protractor in order to make fine adjustment of zero without moving the pointer. An enlarged pointer as indicated in FIG. 4 is installed on the pointer shaft which is rotated by the gauge mechanism. The dial is centered about the pinion shaft with the aid of a small dial centering tool. For example we will assume the uncalibrated gauge to be calibrated is a 100 psi gauge as indicated in FIG. 3.

Figure 2A:
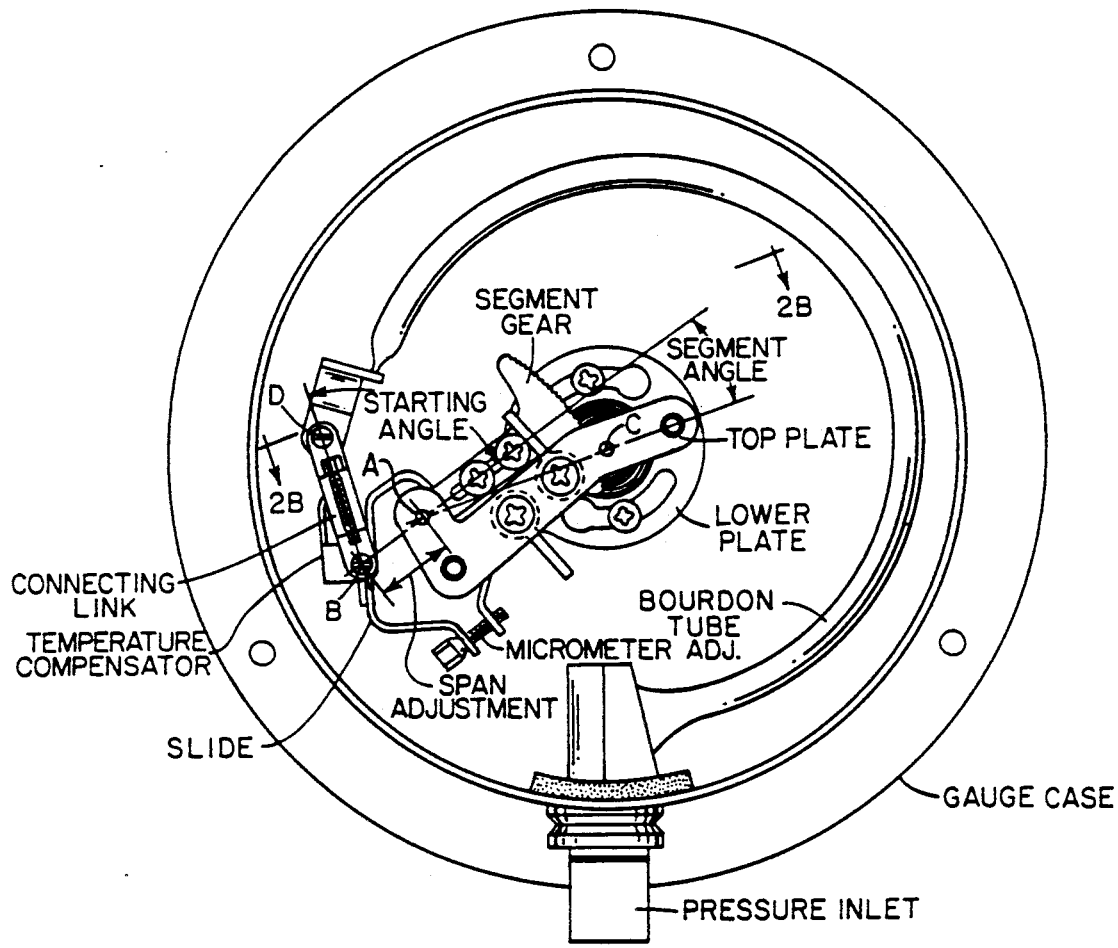
FIG. 2A is a front elevational view of a conventional Bourdon type gauge to which the calibration method of this invention is applicable.
Figure 2B:
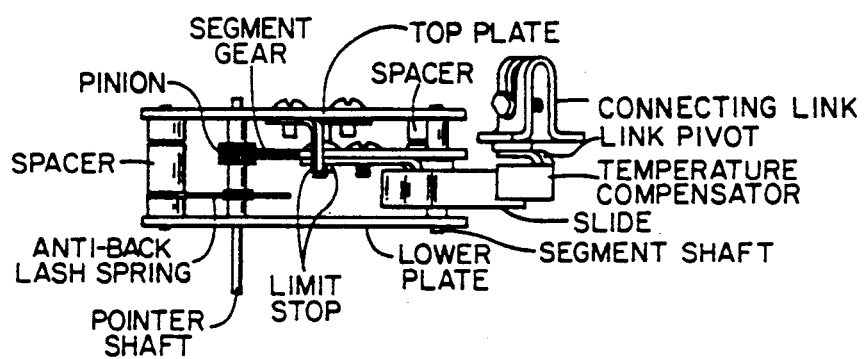
FIG. 2B is a partial sectional view of the gauge of FIG. 2A.
Figure 2C:
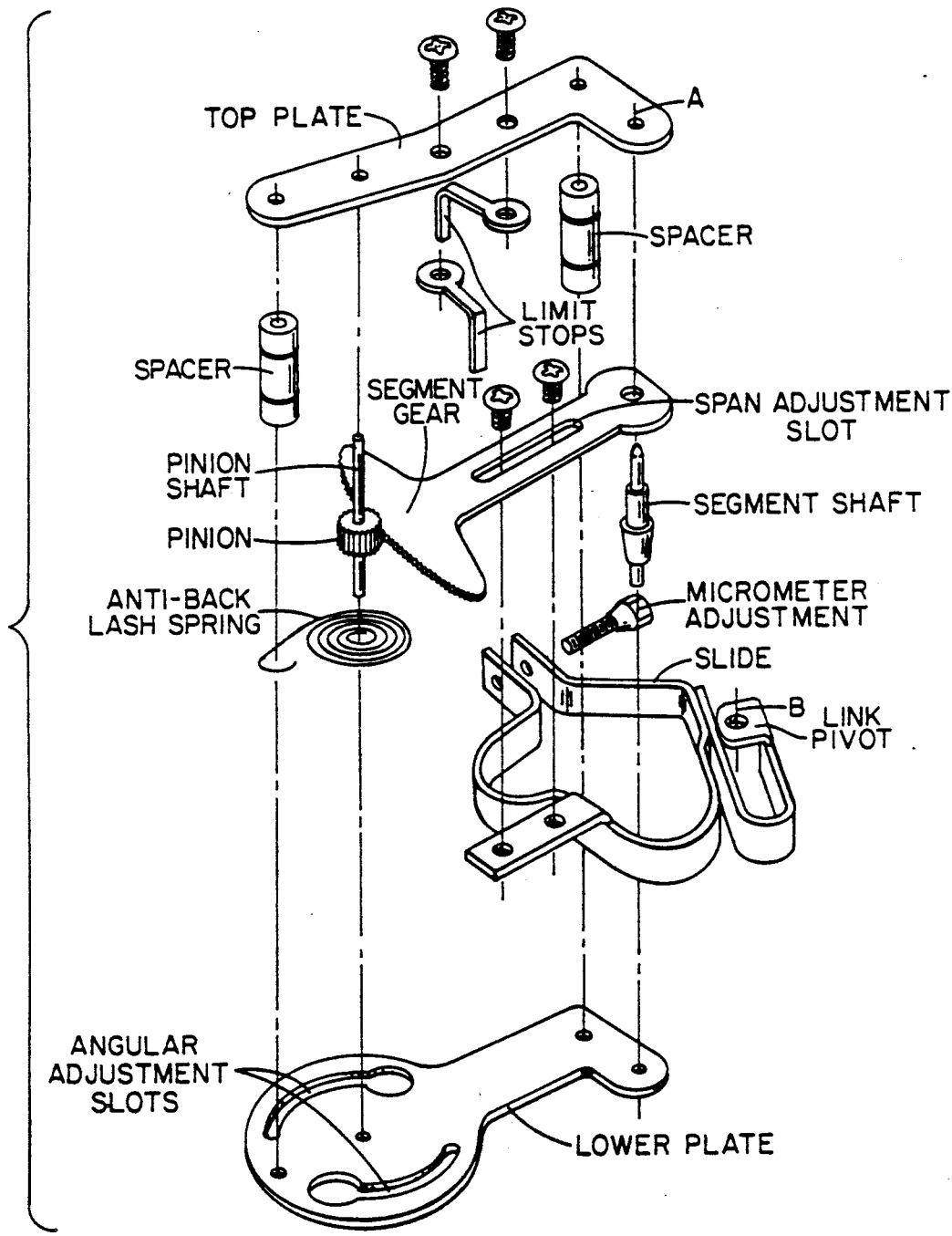
FIG. 2C is an exploded perspective view of the movement mechanism of the gauge of FIG. 2A.

Full pressure is applied to the uncalibrated gauge from a measured source of known pressure. This usually results in rotation of the protractor pointer to somewhere in the vicinity of 270 degrees on the protractor. With zero pressure applied the span adjustment distance indicated in FIG. 2A is measured. This is the distance between the segment pivot which coincides with the centerline of the segment shaft of FIG. 2C and the centerline of the pivoting connection B at one end of the connecting link. A specially designed micrometer for use in making the span adjustment distance measurement is available in a kit. Let us assume that the span adjustment distance is found to be 0.415 inches and the pointer rotation at full pressure is found to be 285 degrees. These numbers are input to a computer program specially designed for calibration of an uncalibrated gauge by the user.

The next step is to convert the pointer rotation into segment rotation which is conveniently done by use of the gear ratio of 11.6 between segment and pinion. Thus 285 degrees of pointer rotation converts to 24.569 degrees of segment rotation. The segment rotation in degrees is converted to radians by the computer which in this case converts to 0.4288 radians. Next the actual tip travel of the uncalibrated gauge over the range of zero to full pressure is calculated by the computer. Since the tip operates over a radius of the span adjustment distance, the actual tip travel is calculated by multiplying the measured span adjustment distance of 0.415 inches of the uncalibrated gauge times the number of radians through which the segment moved, which gives an example 0.178 inch actual tip travel of the uncalibrated gauge. Naturally this is one of the variables of production gauges which in this example differs from the 0.160 tip travel assumed in the baseline case.

Having derived the actual tip travel of 0.178 inches in the uncalibrated gauge example the computer now determines the amount of segment rotation for a tip travel of 0.178 inches which will produce 270 degrees of pointer rotation at full pressure. 270 degrees divided by the gauge gear ratio of 11.6 converts to 23.276 segment degrees or 0.406 radians. The program then causes the computer to divide the actual tip travel of 0.178 inches by the segment radians of 0.406 to produce 270 degrees which tells the operator that the span adjustment distance should be changed to 0.438 inches. The operator then sets the span adjustment distance to 0.438 inches in this example. By reference to FIG. 2C, it is seen that the span adjustment distance can be adjusted by loosening the two screws over the span adjustment slot where it is mounted on a permanent extension of the "slide" which gives a coarse adjustment. A micrometer adjustment screw shown in the slide (FIG. 2C) can be tightened or loosened to make a fine adjustment of the span adjustment distance by changing the relationship between the pivot B of the connecting link and the centerline of the segment shaft which is the pivot point for the segment gear. The slide has the characteristics of a spring allowing it to be bent by adjustment of the micrometer adjustment screw without permanent deformation.

The computer program is preferably designed to permit the test operator to repeat the procedure at full scale pressure once the span adjustment distance has been reset. This should bring the pointer to a reading of 270 degrees at full scale or there may be another slight variation from 270 degrees, in which case the span adjustment distance is again measured accurately and inputted to the computer along with the newly determined pointer reading. The program compares the actual pointer reading with the correct pointer reading at full pressure to determine if another slight adjustment is required.

If another small adjustment is needed the computer is programmed to advise the operator to adjust the micrometer adjustment screw to make a very small correction which will generally bring the pointer to read 270 degrees at full scale without further adjustment.

Once the full scale pressure rotation of the pointer on the protractor affixed to the uncalibrated gauge is corrected to read 270 degrees of pointer rotation by adjusting the span adjustment distance, the test operator is ready to use the curve of FIG. 6 to determine the non-linearity correction required for the uncalibrated gauge. The least squares fit line of FIG. 6 is programmed by the line equation of the form $y = mx + b$. In this case x represents the 50 percent non-linearity deviation in degrees and y equals the pointer rotation in degrees. The uncalibrated gauge is pressurized to 50 percent of full scale pressure after setting the protractor pointer at zero by slightly rotating the protractor scale if necessary. At 50 percent of pressure the protractor reading is obtained which for example might be 137.5 degrees. Since the correct reading at 50 percent of full scale should be 135 degrees (the zero point on FIG. 6) a deviation of 2.5 degrees is obtained by subtracting 135 degrees from the example pointer reading of 137.5 degrees at 50 percent of full pressure. The test operator inputs the pointer reading of 137.5 into the computer and the computer, using the equation of the corrected data curve shown in FIG. 6 (from the proper curve for that gauge geometry) determines that a positive deviation of 2.5 degrees non-linearity at the 50 percent point corresponds to a pointer rotation of 175 degrees. The computer program instructs the operator to remove the uncalibrated gauge pressure and rotate (arcuately position) the movement until the pointer reads 175 degrees. By reference to FIG. 2A and FIG. 2C it is seen that the movement has a lower plate with angular adjustment slots which permits arcuate orientation of the whole movement about the driven pointer shaft by loosening the two screws just enough that the lower plate and the affixed remainder of the movement can be rotated. Because the segment is connected through the link to the Bourdon tube at one end of the segment gear, one end cannot move and the rotation of the movement results in movement of the gear end of the segment and rotation of the pointer depending upon which direction of rotation is chosen. The movement screws are tightened in the angular adjustment slots and the pointer is reset at zero degrees by removing it from pointing at 175 degrees and replacing it to point at 0 degrees.

Now the computer program instructs the operator to apply full pressure and input the pointer angle at full pressure which should now read 270 degrees. In the event that there is a slight discrepancy from the full span reading the computer compares the inputted reading with 270 degrees and recalculates a small span adjustment distance correction which the operator makes and inputs to the computer. The calculations are made in exactly the same manner as in the previous span adjustments. This small span adjustment has no significant effect on the linearity of the gauge and usually amounts to only a very minor correction. The operator is then instructed to check the gauge at 0, 25, 50, 75 and 100% of full pressure. When the operator verifies that the readings are correct the protractor pointer and dial are removed and the gauge pointer is replaced. After the pointer is tapped into place the gauge is verified by checking it at the quarter and half points between zero and full gauge pressure and the gauge should read right on. The face is replaced and the uncalibrated gauge is now calibrated and ready to use.

The inventive method provides a method adaptable to the use of a computer program on a real time basis which receives measurements and calculates adjustments which are then made to the gauge and new measurements are provided to the computer which permits the operator to calibrate an uncalibrated gauge to near baseline non-linearity based upon angular movement of the gauge pointer at only two positions. The pointer dial measurements are made at full gauge pressure and at 50 percent of full gauge pressure to calibrate the gauge no matter what the segment pinion relationship is to begin with. No bending of the pointer or the Bourdon tube tip is required as with previous methods. Only one or a few iterations are necessary first to adjust the span and then to adjust out the non-linearity using data developed from a baseline model. The correction is applicable to a series of gauges having the same geometry which means the same nominal travel and position of the Bourdon tube. A curve like FIG. 6 is generated for input to the computer program for each such condition. Information necessary to select the proper FIG. 6 curve is usually based conveniently upon a range of pressure within which particular gauges may fall. For example, a series of gauges may have the same geometry but cover a range of 60 to 1000 pounds per square inch.

TABLE I

| BASELINE CALIBRATION | |
|---|---|
| Start Angle | 77.8 degrees |
| Span Adjustment | 0.396 inches |

TABLE I-continued
BASELINE CALIBRATION

Tip Travel  0.16 inches
Link Length  0.75 inches
Segment Angle  8.22 degrees

| Col. 1 Theo % FS | Col. 2 Segment Angle Theo | Col. 3 Segment Angle Determined | Col. 4 Gear Ratio | Col. 5 Pinion Angle Theo | Col. 6 Pinion Angle Determined | Col. 7 Degrees of Pinion Deviation | Col. 8 Linkage % N.L.F.S. | Col. 9 Dial % N.L.F.S. | Col. 10 Gauge % N.L.F.S. |
|---|---|---|---|---|---|---|---|---|---|
| 0 | 0 | 0 | 11.6 | 0 | 0.000 | 0.000 | 0.000 | 0.000 | 0.000 |
| 25 | 5.189 | 5.861 | 11.6 | 67.5 | 67.988 | 0.488 | 0.181 | −0.120 | 0.061 |
| 50 | 11.638 | 11.657 | 11.6 | 135 | 135.221 | 0.221 | 0.082 | 0.000 | 0.082 |
| 75 | 17.457 | 17.439 | 11.6 | 202.5 | 202.292 | −0.208 | −0.077 | 0.120 | 0.043 |
| 100 | 23.276 | 23.292 | 11.6 | 270 | 270.187 | 0.187 | 0.069 | 0.000 | 0.069 |

TABLE II
MINIMUM STARTING TEETH ENGAGEMENT

Start Angle  62.7409 degrees
Span Adjustment  0.415 inches
Tip Travel  0.16 inches
Link Length  0.75 inches
Segment Angle  29.07 degrees

| Col. 1 Theo % FS | Col. 2 Segment Angle Theo | Col. 3 Segment Angle Determined | Col. 4 Gear Ratio | Col. 5 Pinion Angle Theo | Col. 6 Pinion Angle Determined | Col. 7 Degrees of Pinion Deviation | Col. 8 Linkage % N.L.F.S. | Col. 9 Dial % N.L.F.S. | Col. 10 Gauge % N.L.F.S. |
|---|---|---|---|---|---|---|---|---|---|
| 0 | 0 | 0 | 11.6 | 0 | 0.000 | 0.000 | 0.000 | 0.000 | 0.000 |
| 25 | 5.189 | 6.086 | 11.6 | 67.5 | 70.598 | 3.098 | 1.147 | −0.120 | 1.027 |
| 50 | 11.638 | 11.961 | 11.6 | 135 | 138.748 | 3.748 | 1.388 | 0.000 | 1.388 |
| 75 | 17.457 | 17.666 | 11.6 | 202.5 | 204.926 | 2.426 | 0.898 | 0.120 | 1.018 |
| 100 | 23.276 | 23.279 | 11.6 | 270 | 270.036 | 0.036 | 0.013 | 0.000 | 0.013 |

TABLE III
MAXIMUM STARTING TEETH ENGAGEMENT

Start Angle  82.5667 degrees
Span Adjustment  0.399 inches
Tip Travel  0.16 inches
Link Length  0.75 inches
Segment Angle  −0.0895 degrees

| Col. 1 Theo % FS | Col. 2 Segment Angle Theo | Col. 3 Segment Angle Determined | Col. 4 Gear Ratio | Col. 5 Pinion Angle Theo | Col. 6 Pinion Angle Determined | Col. 7 Degrees of Pinion Deviation | Col. 8 Linkage % N.L.F.S. | Col. 9 Dial % N.L.F.S. | Col. 10 Gauge % N.L.F.S. |
|---|---|---|---|---|---|---|---|---|---|
| 0 | 0 | 0 | 11.6 | 0 | 0.000 | 0.000 | 0.000 | 0.000 | 0.000 |
| 25 | 5.189 | 5.752 | 11.6 | 67.5 | 66.723 | −0.777 | −0.288 | −0.120 | −0.408 |
| 50 | 11.638 | 11.502 | 11.6 | 135 | 133.423 | −1.577 | −0.584 | 0.000 | −0.584 |
| 75 | 17.457 | 17.311 | 11.6 | 202.5 | 200.808 | −1.692 | −0.627 | 0.120 | −0.507 |
| 100 | 23.276 | 23.278 | 11.6 | 270 | 270.025 | 0.025 | 0.009 | 0.000 | 0.009 |

TABLE IV
HALFWAY BASELINE TO MINIMUM TEETH ENGAGEMENT

Start Angle  70.26 degrees
Span Adjustment  0.4 inches
Tip Travel  0.16 inches
Link Length  0.75 inches
Segment Angle  18.167 degrees

| Col. 1 Theo % FS | Col. 2 Segment Angle Theo | Col. 3 Segment Angle Determined | Col. 4 Gear Ratio | Col. 5 Pinion Angle Theo | Col. 6 Pinion Angle Determined | Col. 7 Degrees of Pinion Deviation | Col. 8 Linkage % N.L.F.S. | Col. 9 Dial % N.L.F.S. | Col. 10 Gauge % N.L.F.S. |
|---|---|---|---|---|---|---|---|---|---|
| 0 | 0 | 0 | 11.6 | 0 | 0.000 | 0.000 | 0.000 | 0.000 | 0.000 |
| 25 | 5.189 | 5.977 | 11.6 | 67.5 | 69.333 | 1.833 | 0.679 | −0.120 | 0.559 |
| 50 | 11.638 | 11.814 | 11.6 | 135 | 137.042 | 2.042 | 0.756 | 0.000 | 0.756 |
| 75 | 17.457 | 17.554 | 11.6 | 202.5 | 203.626 | 1.126 | 0.417 | 0.120 | 0.537 |
| 100 | 23.276 | 23.279 | 11.6 | 270 | 270.036 | 0.036 | 0.013 | 0.000 | 0.013 |

TABLE V
QUARTER WAY BASELINE TO MINIMUM TEETH ENGAGEMENT

Start Angle  73.939 degrees
Span Adjustment  0.398 inches
Tip Travel  0.16 inches
Link Length  0.75 inches

TABLE V-continued

QUARTER WAY BASELINE TO MINIMUM TEETH ENGAGEMENT

Segment Angle     16.956 degrees

| Col. 1 Theo % FS | Col. 2 Segment Angle Theo | Col. 3 Segment Angle Determined | Col. 4 Gear Ratio | Col. 5 Pinion Angle Theo | Col. 6 Pinion Angle Determined | Col. 7 Degrees of Pinion Deviation | Col. 8 Linkage % N.L.F.S. | Col. 9 Dial % N.L.F.S. | Col. 10 Gauge % N.L.F.S. |
|---|---|---|---|---|---|---|---|---|---|
| 0 | 0 | 0 | 11.6 | 0 | 0.000 | 0.000 | 0.000 | 0.000 | 0.000 |
| 25 | 5.189 | 5.9178 | 11.6 | 67.5 | 68.646 | 1.146 | 0.425 | −0.120 | 0.305 |
| 50 | 11.638 | 11.732 | 11.6 | 135 | 136.091 | 1.091 | 0.404 | 0.000 | 0.404 |
| 75 | 17.457 | 17.491 | 11.6 | 202.5 | 202.896 | 0.396 | 0.147 | 0.120 | 0.267 |
| 100 | 23.276 | 23.276 | 11.6 | 270 | 270.002 | 0.002 | 0.001 | 0.000 | 0.001 |

TABLE VI

HALFWAY BASELINE TO MAXIMUM TEETH ENGAGEMENT

Start Angle      80.592 degrees
Span Adjustment  0.397 inches
Tip Travel       0.16 inches
Link Length      0.75 inches
Segment Angle    4.025 degrees

| Col. 1 Theo % FS | Col. 2 Segment Angle Theo | Col. 3 Segment Angle Determined | Col. 4 Gear Ratio | Col. 5 Pinion Angle Theo | Col. 6 Pinion Angle Determined | Col. 7 Degrees of Pinion Deviation | Col. 8 Linkage % N.L.F.S. | Col. 9 Dial % N.L.F.S. | Col. 10 Gauge % N.L.F.S. |
|---|---|---|---|---|---|---|---|---|---|
| 0 | 0 | 0 | 11.6 | 0 | 0.000 | 0.000 | 0.000 | 0.000 | 0.000 |
| 25 | 5.189 | 5.805 | 11.6 | 67.5 | 67.338 | −0.162 | −0.060 | −0.120 | −0.180 |
| 50 | 11.638 | 11.577 | 11.6 | 135 | 134.293 | −0.707 | −0.262 | 0.000 | −0.262 |
| 75 | 17.457 | 17.37 | 11.6 | 202.5 | 201.492 | −1.008 | −0.373 | 0.120 | −0.253 |
| 100 | 23.276 | 23.277 | 11.6 | 270 | 270.013 | 0.013 | 0.005 | 0.000 | 0.005 |

TABLE VII

SUMMARY

| Case Type | Col. 1 Starting Angle | Col. 2 Segment Angle | Col. 3 Delta Segment Angle | Col. 4 Pointer Rotation Degrees | Col. 5 50% N.L.F.S. Degrees | Col. 6 50% N.L.F.S. % F.S. |
|---|---|---|---|---|---|---|
| Minimum Starting | 62.74 | 29.07 | −20.85 | 241.86 | 3.748 | 1.39 |
| Halfway To Baseline | 70.26 | 18.167 | −9.95 | 115.42 | 2.042 | 0.76 |
| Quarter Way To Baseline | 73.9 | 16.956 | −8.74 | 101.38 | 1.0912 | 0.4 |
| Baseline | 77.59 | 8.22 | 0 | 0 | 0 | 0 |
| Halfway From Baseline | 80.6 | 4.025 | 4.195 | −48.66 | −0.71 | −0.26 |
| Maximum Starting | 83.57 | −.0895 | 8.3095 | −96.39 | −1.58 | −0.58 |

I claim:

1. Method of calibrating pressure gauges having a pressure responsive element which moves proportionate to applied pressure, the element being unrigidly linked at a gain producing span adjusting distance from the pivot point of a segment gear, the segment gear being pivoted in a movement drivingly engaging a pinion gear mounted in the movement to operate a dial indicating pointer shaft and pointer, the movement being rotatably positionable about the pointer shaft between maximum and minimum starting teeth engagement of the pinion gear with the segment gear, the method comprising:

(1) developing an analogue baseline model of a calibrated gauge linkage within design dimensions and design movement of the pressure responsive element from zero to full span pressure;

(2) manipulating the baseline model to selected segment angles representative of the possible starting positions of the pinion gear on the segment gear and determining deviation in percent non-linearity full scale from the baseline condition as a function of pointer rotation; and (3) calibrating a pressure gauge by adjustment of the gain to span the gauge at full pressure followed by application of a reference pressure most selective of linkage non-linearity, applying the relationship developed in step (2) to determine pointer angle which is corrective of the linkage non-linearity found, unpressurizing the gauge, rotating the movement to produce the corrective pointer angle and replacing the pointer at zero.

2. The method of claim 1 wherein the method includes a second repeated calibrating step.

3. The method of claim 1 wherein the calibrating step is performed by operation of a programmed computer responsive to operator input which informs the operator of the amount of span adjustment distance and movement rotation necessary to perform the calibration.

4. The method of claim 1 wherein the calibrating step is performed by operation of a computer programmed to include the steps of:

determining the difference between the pointer angle measured at the reference pressure and the pointer angle of the baseline case at the reference pressure;

converting the difference in the measured and baseline pointer angles to percent of full scale; and determining the pointer angle corresponding to the difference in percent of full scale found in the preceding step.

5. The method of claim 1 wherein the baseline model is manipulated by means of a programmed computer.

6. The method of claim 5 wherein the reference pressure is about 50 percent of full scale pressure.

7. The method of claim 6 wherein the reference pressure most selective of linkage non-linearity is selected on the basis of the non-linearity determined at extreme possible operable starting teeth engagement positions and at least one intermediate starting teeth position between each of said extremes and the baseline condition evaluated at selected positions over the pressure range including selected positions of about one quarter of full scale on either side of the midpoint.

8. The method of claim 1 wherein the step of developing an analogue baseline model of a calibrated gauge linkage includes:
constructing a manipulatable analogue model having nominal design tip movement of the pressure responsive element over the full span and a predetermined segment orientation which is known to produce acceptable non-linearity.

9. The method of claim 8 wherein the reference pressure most selective of linkage non-linearity is selected on the basis of the non-linearity determined at extreme possible operable starting teeth engagement positions and at least one intermediate starting teeth position between each of said extremes and the baseline condition evaluated at selected positions over the pressure range including selected positions of about one quarter of full scale on either side of the midpoint; and
the step of manipulating the model includes manipulation of the linkage of the baseline model over a range of segment orientations at zero pressure including at least one intermediate position selected as a reference position most representative of linkage non-linearity error, the segment positions being represented by pointer angle.

10. The method of claim 9 wherein the pointer indication representative of the magnitude of percent non-linearity full scale at the reference position is corrected to reflect a baseline model case of near zero percent non-linearity at the reference position so that a spanned uncalibrated gauge when subjected to the reference pressure will have a deviation from theoretical linearity as a percent full scale which permits selecting the corrective pointer angle which adjusts the segment angle to the baseline model case to calibrate the gauge.

11. The method of claim 1 wherein the step of developing the analogue model further includes the steps of:
(1) laying out the gauge linkage at nominal dimensions at an assumed nominal tip travel distance over the nominal range of span pressure, with a zero pressure segment angle which produces acceptable linearity of the pointer over the gauge span to establish a baseline case;
(2) manipulating the baseline case linkage to obtain a selected number of segment angle positions representative of the possible segment angles including at least a reference position most representative of non-linearity deviation over the span and convert at least the deviation at the reference position to percent non-linearity full scale;
(3) determining the difference between the baseline segment angle and the segment angles of the manipulated selected positions at a selected indicated pressure within the span and convert the angular differences to pointer readings above and below the baseline case; and
(4) determine the relationship between percent non-linearity at the reference position of step (2) and the pointer readings of step (3) corrected by the amount of baseline case pointer reading at the reference position for use in determining from the deviation in pointer reading at the reference position pressure, the pointer reading obtainable by arcuate positioning of the movement which will properly orient the segment of an uncalibrated spanned gauge to the baseline case orientation.

12. The method of claim 11 wherein the baseline model is manipulated by means of a programmed computer.

13. The method of claim 12 wherein the calibrating step is performed by operation of a programmed computer.

14. The method of claim 13 wherein the method includes a repeated calibrating step.

15. The method of claim 1 further comprising as initial steps:
(1) removing the gauge pointer from the pointer shaft;
(2) overlaying the face of the gauge with a radially enlarged dial calibrated in angular degrees; and
(3) affixing a radially enlarged pointer to said pointer shaft to cooperate with said enlarged dial.

16. Method of developing a linkage model to use in calibrating a pressure gauge of the type having a movement with a pivoting movement segment element drivingly engaging a pinion gear to turn a pointer shaft and being arcuately positionable around the driven pointer shaft, the gauge having a pressure responsive member with a tip which moves proportionate to applied pressure, linked to the pivoting movement element at an adjustable distance from the pivot to produce a gain in the pivoting movement and pointer, comprising the steps of:
(1) laying out gauge linkage at design dimensions for design tip movement over full span with a segment angle representative of a gauge having acceptable linkage non-linearity to establish the baseline case;
(2) manipulating the laid-out linkage to deviate from the baseline case at selected starting segment angles representative of the range of possible starting segment angle orientations using the dial indicating pointer as an amplified measure of segment angle and determine the deviation from theoretical as a percentage of full pressure at a reference pressure, which is selective of said deviation; and
(3) determine the pointer indication representative of the magnitude of percent non-linearity full scale at the reference pressure corrected to reflect a baseline case of zero percent non-linearity at the reference pressure so that a spanned uncalibrated gauge when subjected to the reference pressure will have a deviation from theoretical linearity as a percent full scale which permits selecting an unpressurized pointer indication by movement rotation which adjusts the segment angle to the baseline case to calibrate a gauge.

17. The method of claim 16 wherein the selected starting segment angles include maximum starting teeth engagement and minimum starting teeth engagement of the segment gear with the pinion gear.

18. Method of developing a linkage model to use in calibrating a pressure gauge of the type having a movement with a pivoting movement segment element drivingly engaging a pinion gear to turn a pointer shaft and being arcuately positionable around the driven pointer shaft, the gauge having a pressure responsive member with a tip which moves proportionate to applied pressure linked to the pivoting movement element at an adjustable distance from the pivot to produce a gain in the pivoting movement and pointer, comprising the steps of:

(1) laying out the gauge linkage at nominal dimensions at an assumed nominal tip travel distance over the nominal range of span pressure, with a zero pressure segment angle which produces acceptable linearity of the pointer over the gauge span to establish a baseline case;

(2) manipulating the baseline case linkage to obtain a selected number of segment angle positions representative of the possible segment angles including at least a reference position most representative of non-linearity deviation over the span and convert at least the deviation at the reference position to percent non-linearity full scale;

(3) determining the difference between the baseline segment angle and the segment angles of the manipulated selected positions at a selected indicated pressure within the span and convert the angular differences to pointer reading above and below the baseline case; and (4) determine the relationship between percent non-linearity at the reference position of step (2) and the pointer reading of step (3) corrected by the amount of baseline case pointer reading at the reference position for use in determining from the deviation in pointer reading at the reference position pressure, the pointer reading obtainable by arcuate positioning of the movement which will properly orient the segment of an uncalibrated spanned gauge to the baseline case orientation.

19. A method of calibrating a pressure gauge by constructing an analogue model of the gauge linkage and using a dial indicating pointer as an amplified measure of the linkage orientation for gauges having a tip which moves in response to pressure and a movement angularly orientable about the pointer shaft, the movement including a pivoting segment gear driving a pinion fixed to the pointer shaft, the segment gear being connected to the movable tip by a connecting link attached to the segment gear at a segment pivoting radius which constitutes a gauge span adjustment distance, the steps comprising:

(1) construct a manipulatable analogue model of a gauge having nominal tip movement over the full span and a predetermined segment orientation which is known to produce minimum non-linearity;

(2) manipulate the model at sufficient positions intermediate zero and full gauge pressure to establish the non-linearity deviation from theoretical of the segment over the range of selected possible positions of the initial segment orientation at zero pressure, by means of the dial pointer to represent segment orientation at the intermediate positions, one of said intermediate positions being selected as a reference position most representative of non-linearity error;

(3) determine the relationship between non-linearity deviation at the reference position, converted to a percentage of full scale, and the pointer angle using a plurality of initial segment orientations;

(4) set the pointer of an unpressurized uncalibrated gauge at zero, apply full scale actual pressure and determine the resulting pointer angle;

(5) determine the actual tip movement of the uncalibrated gauge over the full pressure span using the pointer angle which magnifies the segment angle;

(6) determine the span adjustment distance of the linkage using the tip movement of the uncalibrated gauge over full span which is necessary to correct the pointer angle to the proper full scale position and span the gauge;

(7) pressurize the uncalibrated gauge to the reference position and determine the angular pointer position and the non-linearity deviation from theoretical thereby indicated and return the uncalibrated gauge to unpressurized condition;

(8) determine a corrected angular pointer position from the relationship between the non-linearity deviation at the reference position and the pointer angle established in step (3);

(9) angularly orient the movement of the uncalibrated gauge to the corrected pointer position found in step (8); and

(10) remove the uncalibrated gauge pointer and replace it to read zero on the unpressurized gauge thereby establishing a relationship of movement orientation which minimizes linkage non-linearity, resulting in a calibrated gauge.

20. Method of calibrating a Bourdon tube pressure gauge of the type having a Bourdon tube with a tip which moves in response to pressure, and a movement adjustably rotatable about a dial indicator shaft, including a dial indicator on a shaft rotated by a pinion gear engaged by a pivoting segment gear, the tip of the Bourdon tube being connected by a link to the movement at a pivotal radius from the segment gear pivot, which constitutes a span adjusting distance, the steps comprising:

(1) determine the span adjustment distance and segment angle at zero pressure of a type gauge known to be adjusted for acceptable linearity over full range span;

(2) layout the linkage parts at design dimensions to create a baseline model that permits incrementing the linkage between zero and full scale at least including several intermediate theoretical percentages of full scale;

(3) determine the baseline segment angle of the baseline model at theoretical 50 percent of full scale on the indicator and determine the baseline deviation of the segment angle from theoretical;

(4) manipulate the linkage of the baseline model to at least a first operable extreme position, a second opposite operable extreme position and an intermediate position between one of said first and second positions and the baseline position of the segment gear with respect to the pinion gear, determine the segment angle at each position corresponding to zero gauge pressure and 50 percent of full gauge pressure, determine the angular deviation of the indicator from theoretical at 50 percent of full scale and convert the angular deviations to angular deviations of the segment angles;

(5) convert the angular deviation of the segment angle from theoretical at the 50 percent of full scale position to percent of full scale for each manipulated position of the linkage;

(6) determine the algebraic difference between the segment angle at zero pressure of the baseline position and each manipulated position and convert each of the differences to degrees of indicator angle above and below the zero baseline position;

(7) determine the best fit line of the resulting data from step (5) plotted against degrees of indicator angle from step (6) to get the relationship between the percent of full scale linkage non-linearity at 50 percent and the indicator angle in degrees;

(8) determine the indicator angle of an uncalibrated gauge at full gauge pressure and the span adjustment distance of the uncalibrated gauge;

(9) use the indicator angle to determine the tip travel of the uncalibrated gauge between zero and full scale pressure;

(10) determine the span adjustment distance for the tip travel of the uncalibrated gauge found in step (9) necessary to produce a 270 degree indicator angle from zero to full pressure;

(11) span the uncalibrated gauge with the result of step (10);

(12) determine the indicator angle of the uncalibrated gauge at 50 percent of full pressure;

(13) determine the difference between the indicator angle of step (12) and 135 degrees;

(14) determine the indicator angle from the relationship of step (7) based upon the difference at 50 percent of full pressure of the indicator angle difference determined in step (13);

(15) remove pressure from the uncalibrated gauge and rotate the movement about the indicator shaft to produce the indicator angle found in step (14); and

(16) remove and reset the indicator to zero and tighten the movement to obtain a calibrated gauge.

21. The method of calibrating a Bourdon tube type fluid pressure gauge having a fixed axis pointer shaft, a pivoted segment for rotating said pointer shaft, and a movement pivotally connecting the movable end of the Bourdon tube to said pivoted segment to rotate said pointer shaft in proportion to the fluid pressure applied to said Bourdon tube, said movement having means for adjusting the span distance between the axis of said pivoted segment connection and the axis of said pivotal connection between said movement and the movable end of said Bourdon tube; comprising the steps of:

(1) programming a computer to calculate the span distance required for calibration of a specific size and type gauge based on sequential inputs of initial span distance and angular positions of the pointer in response to the application of 100% pressure and 50% pressure to the gauge;

(2) measuring said span distance;

(3) inputting said span distance into the computer;

(4) applying 100% of maximum fluid pressure to the Bourdon tube and reading the resulting angular position of the pointer;

(5) inputting said angular pointer position into the computer;

(6) calculating by the computer the revised span distance required for calibration;

(7) adjusting said span distance to said revised distance;

(8) applying 50% of maximum fluid pressure to the Bourdon tube and reading the resulting angular position of the pointer;

(9) inputting said resulting angular position into the computer;

said movement having means for adjustment of the angular position of said segment relative to the axis of said pointer shaft;

(10) calculating by the computer the required adjustment of segment angular position to achieve calibration;

(11) making said required segment angular position adjustment; and

(12) applying 50% of maximum fluid pressure to the Bourdon tube to determine if calibration is within desired accuracy limits.

22. The method of claim 21 further comprising repeating steps (2) through (12) in the event that the result of the initial calibration is not in prescribed tolerance limits.

* * * * *

UNITED STATES PATENT AND TRADEMARK OFFICE
CERTIFICATE OF CORRECTION

PATENT NO. : 5,067,100
DATED : November 19, 1991
INVENTOR(S) : Bissell, et al.

It is certified that error appears in the above-identified patent and that said Letters Patent is hereby corrected as shown below:

In column 3, line 58, delete "ever" and add --every--.
In column 11, line 45, after "it is conceivable" add --that some gauge geometry might produce greater selectivity--.
In column 21, line 21, delete "reading" and add --readings--.

Signed and Sealed this

Second Day of March, 1993

Attest:

STEPHEN G. KUNIN

*Attesting Officer*   Acting Commissioner of Patents and Trademarks